United States Patent
Wensman

Patent Number: 5,520,360
Date of Patent: May 28, 1996

[54] ADJUSTABLE JACK STAND

[76] Inventor: Scott M. Wensman, 4817-B Jackson St., Riverside, Calif. 92503

[21] Appl. No.: 329,184

[22] Filed: Oct. 26, 1994

[51] Int. Cl.⁶ .................................................... F16M 13/00
[52] U.S. Cl. .................... 248/354.5; 248/357; 248/188.5
[58] Field of Search ............................... 248/354.3, 354.4, 248/354.5, 352, 357, 408, 680, 688, 188.5, 188.7, 425

[56] References Cited

U.S. PATENT DOCUMENTS

| | | | |
|---|---|---|---|
| 496,739 | 2/1893 | Kennedy | 248/354.4 |
| 3,313,505 | 4/1967 | Petrie | 248/354.5 |
| 4,042,202 | 8/1977 | Molinari | 248/354.5 |
| 4,684,097 | 8/1987 | Cox | 248/354.3 |
| 4,690,361 | 9/1987 | Lundman | 248/352 |
| 4,870,789 | 10/1989 | Clark et al. | 248/354.3 X |

FOREIGN PATENT DOCUMENTS

| | | | |
|---|---|---|---|
| 617856 | 2/1961 | Italy | 248/354.3 |
| 745742 | 7/1980 | U.S.S.R. | 248/352 |

*Primary Examiner*—Karen J. Chotkowski

[57] ABSTRACT

A new and improved adjustable jack stand with a hollow base support having an aperture formed through a front wall and extends through a back wall. A plurality of support legs are secured to the base support. Included in the invention is a hollow middle section having a plurality of apertures formed through a front wall and through a back wall. The middle section is slidably coupled within the base support. The plurality of apertures optionally align with the aperture formed through the front wall and through the back wall of the base support for securement therewith by a securement pin. A hollow upper section has a cradle support secured thereto. The cradle support serves to support the vehicle. A plurality of apertures are formed through a front wall and through a back wall. The plurality of apertures optionally align with the plurality of apertures formed through the front wall and through the back wall of the middle section for securement therewith by a securement pin.

1 Claim, 4 Drawing Sheets

ADJUSTABLE JACK STAND

BACKGROUND OF THE INVENTION

1. Field of the Invention

The present invention relates to an adjustable jack stand and more particularly pertains to supporting a vehicle or section of a vehicle above the ground at adjustable heights with an adjustable jack stand.

2. Description of the Prior Art

The use of jack stands is known in the prior art. More specifically, jack stands heretofore devised and utilized for the purpose of supporting objects above the ground are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,110,089 to Slay discloses an extendible jack stand.

U.S. Pat. No. 4,486,004 to Drewitz et al. discloses a jack stand.

U.S. Pat. No. 4,021,012 to Miller discloses a jack stand.

U.S. Pat. No. 3,920,212 to Westwood discloses a jack stand.

U.S. Pat. No. 3,802,658 to Binding discloses a jack stand.

While these devices fulfill their respective, particular objective and requirements, the aforementioned patents do not describe an adjustable jack stand for supporting a vehicle or section of a vehicle above the ground at adjustable heights.

In this respect, the adjustable jack stand according to the present invention substantially departs from the conventional concepts and designs of the prior art, and in doing so provides an apparatus primarily developed for the purpose of supporting a vehicle or section of a vehicle above the ground at adjustable heights.

Therefore, it can be appreciated that there exists a continuing need for a new and improved adjustable jack stand which can be used for supporting a vehicle or section of a vehicle above the ground at adjustable heights. In this regard, the present invention substantially fulfills this need.

SUMMARY OF THE INVENTION

In the view of the foregoing disadvantages inherent in the known types of jack stands now present in the prior art, the present invention provides an improved adjustable jack stand. As such, the general purpose of the present invention, which will be described subsequently in greater detail, is to provide a new and improved adjustable jack stand and method which has all the advantages of the prior art and none of the disadvantages.

To attain this, the present invention essentially comprises a base support having an open first end, a closed second end, a front wall, a back wall, and two side walls. A support lip is secured to the open first end. An aperture is formed through the front wall and extends through the back wall downward of the open first end. A support leg is secured extending downwardly from the front wall, the back wall, and from the two side walls. A pin holder is secured to the support leg that is secured to the front wall and the support leg that is secured to the back wall. The device contains a middle section having an open first end, a second end, a front wall, a back wall, and two side walls. An outwardly extending lip is secured to the open first end. A plurality of apertures are formed through the front wall and extend through the back wall. The middle section is slidably coupled within the open first end of the base support. The plurality of apertures optionally align with the aperture formed through the front wall and through the back wall of the base support for securement therewith by a fastening means. The outwardly extending lip serves to prevent the middle section from sliding to a bottom of the base support. The device contains an upper section having a first end, a second end, a front wall, a back wall, and two side walls. A cradle support is secured to the first end. The cradle support serves to support the vehicle. A plurality of apertures are formed through the front wall and extend through the back wall. The plurality of apertures optionally align with the plurality of apertures formed through the front wall and through the back wall of the middle section for securement therewith by a fastening means.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable jack stand which has all the advantages of the prior art jack stands and none of the disadvantages.

It is another object of the present invention to provide a new and improved adjustable jack stand which may be easily and efficiently manufactured and marketed.

It is a further object of the present invention to provide a new and improved adjustable jack stand which is of durable and reliable construction.

An even further object of the present invention is to provide a new and improved adjustable jack stand which is susceptible of a low cost of manufacture with regard to both materials and labor, and which accordingly is then susceptible of low prices of sale to the consuming public, thereby making such a adjustable jack stand economically available to the buying public.

Still yet another object of the present invention is to provide a new and improved adjustable jack stand which provides in the apparatuses and methods of the prior art some of the advantages thereof, while simultaneously overcoming some of the disadvantages normally associated therewith.

Even still another object of the present invention is to provide a new and improved adjustable jack stand for supporting a vehicle or section of a vehicle above the ground at adjustable heights.

Lastly, it is an object of the present invention to provide a new and improved adjustable jack stand with a hollow base support having an aperture formed through a front wall and extends through a back wall. A plurality of support legs are secured to the base support. Included in the invention is a hollow middle section having a plurality of apertures formed through a front wall and through a back wall. The middle section is slidably coupled within the base support. The plurality of apertures optionally align with the aperture formed through the front wall and through the back wall of the base support for securement therewith by a securement pin. A hollow upper section has a cradle support secured thereto. The cradle support serves to support the vehicle. A plurality of apertures are formed through a front wall and through a back wall. The plurality of apertures optionally align with the plurality of apertures formed through the front wall and through the back wall of the middle section for securement therewith by a securement pin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
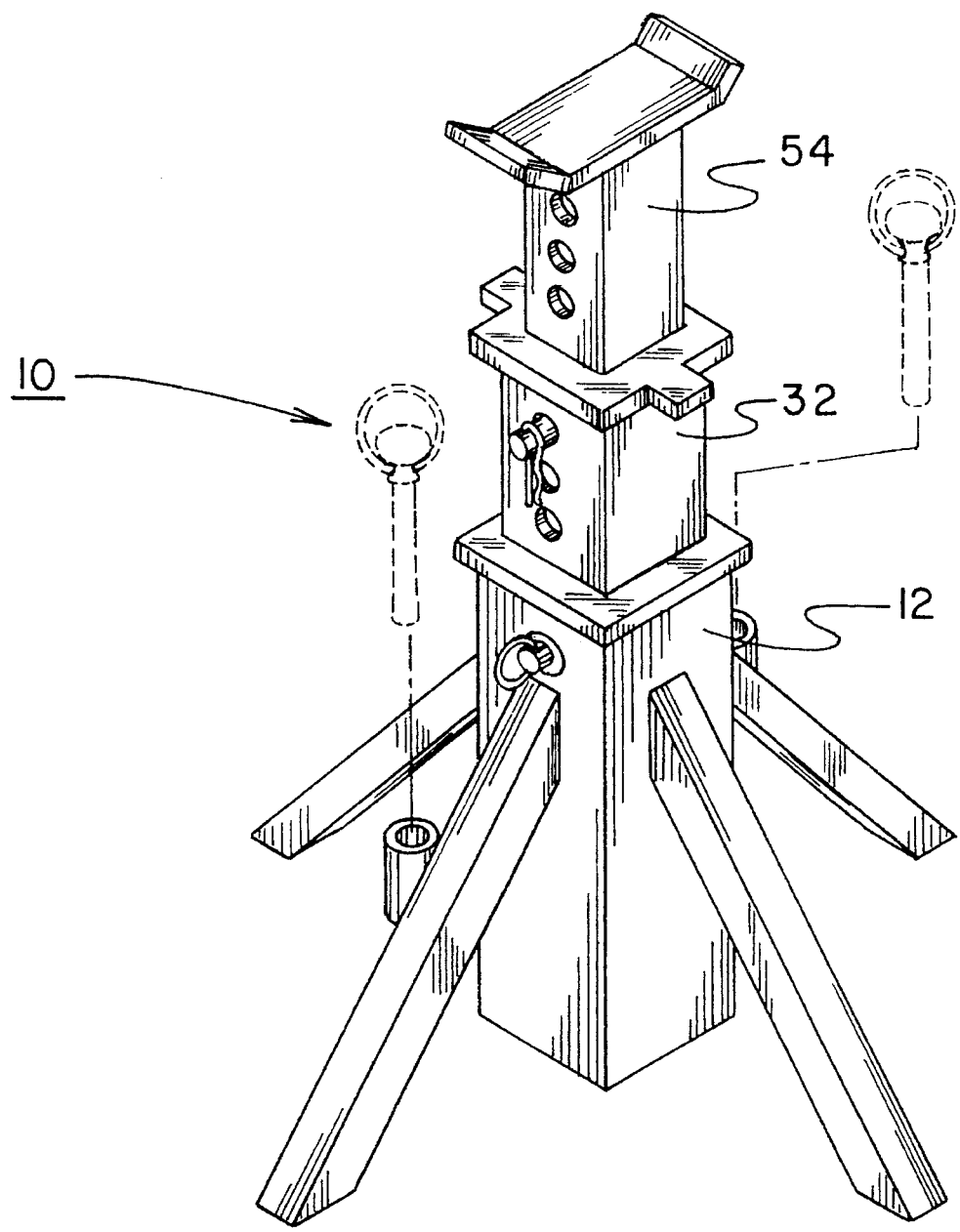
FIG. 1 is a perspective view of the preferred embodiment of the adjustable jack stand constructed in accordance with the principles of the present invention.
Figure 2:
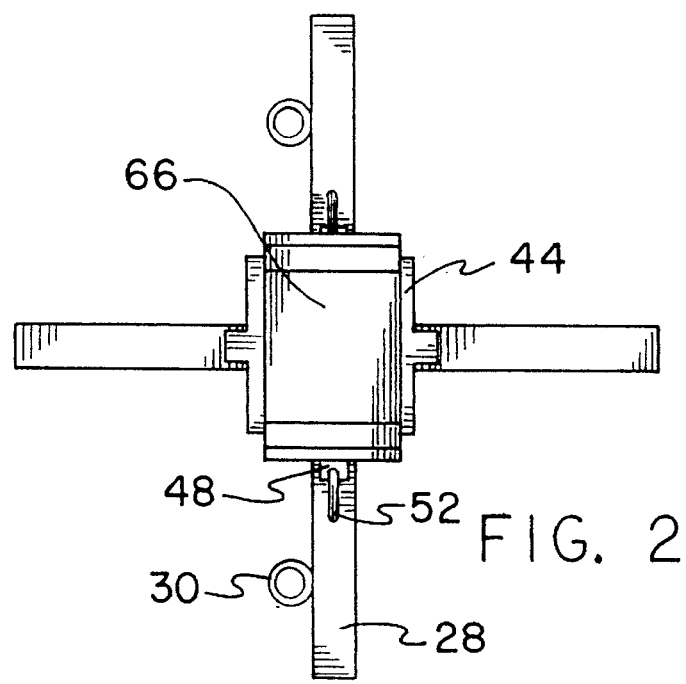
FIG. 2 is a plan view of the preferred embodiment of the present invention.
Figure 3:
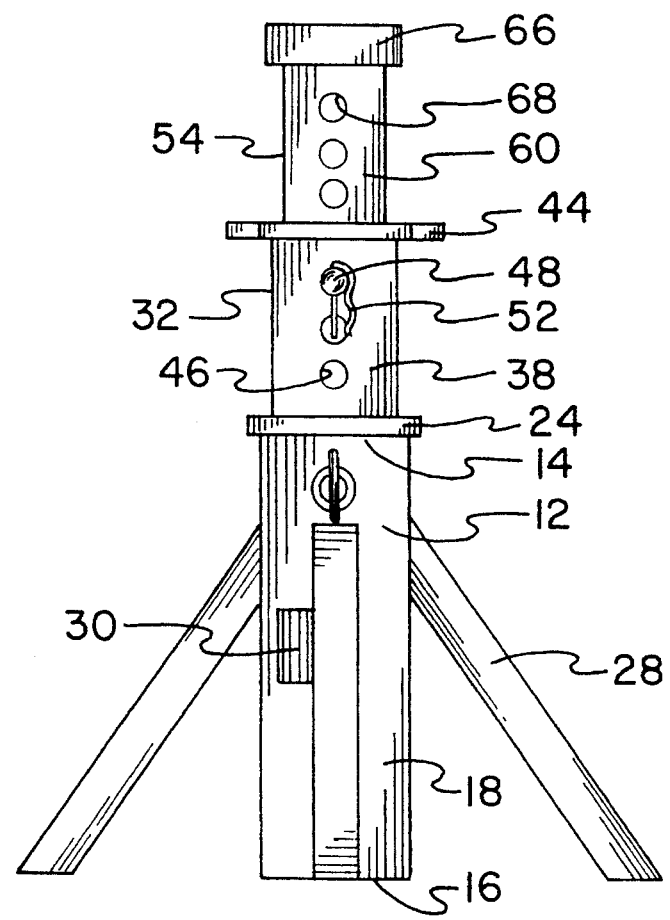
FIG. 3 is a front elevational view of the present invention.
Figure 4:
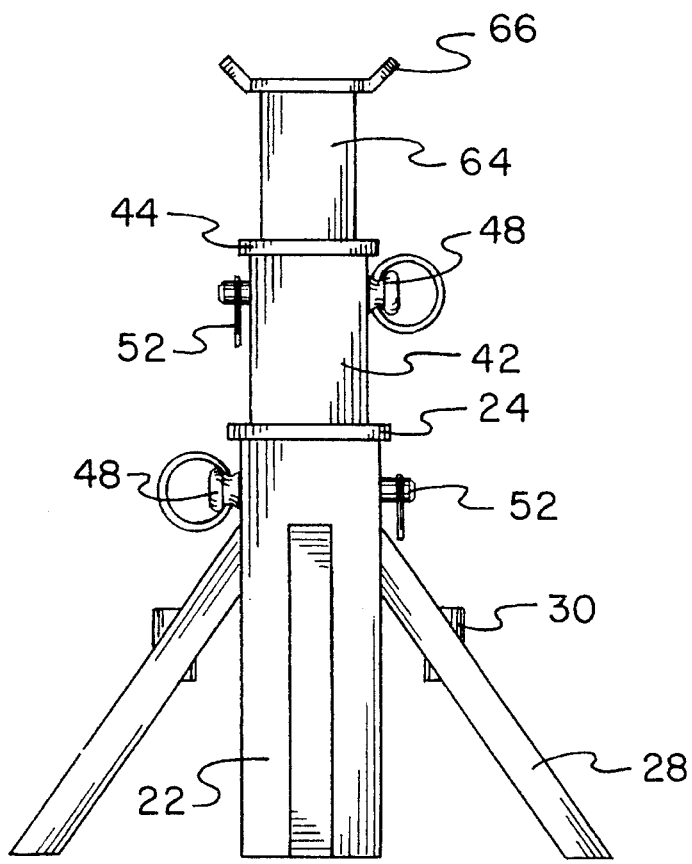
FIG. 4 is a side elevational view of the present invention.
Figure 5:
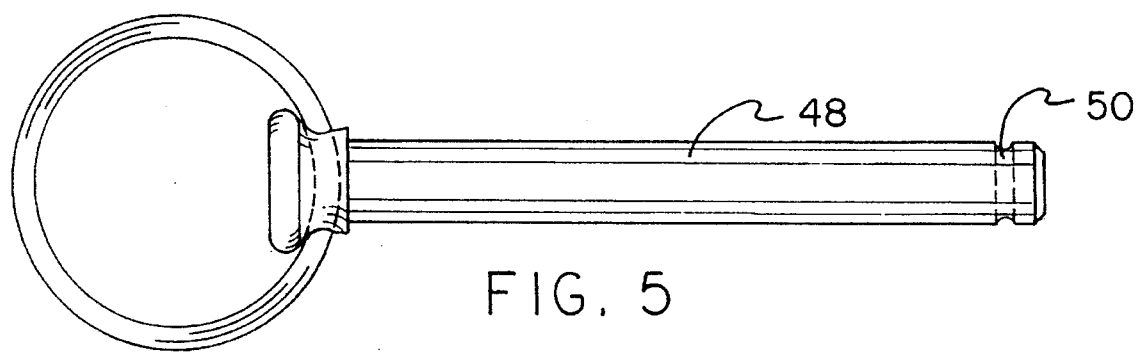
FIG. 5 is an enlarged view of the case hardened pin of the present invention.
Figure 6:
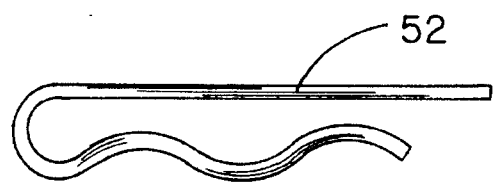
FIG. 6 is an enlarged view of the securement pin of the present invention.
Figure 7:
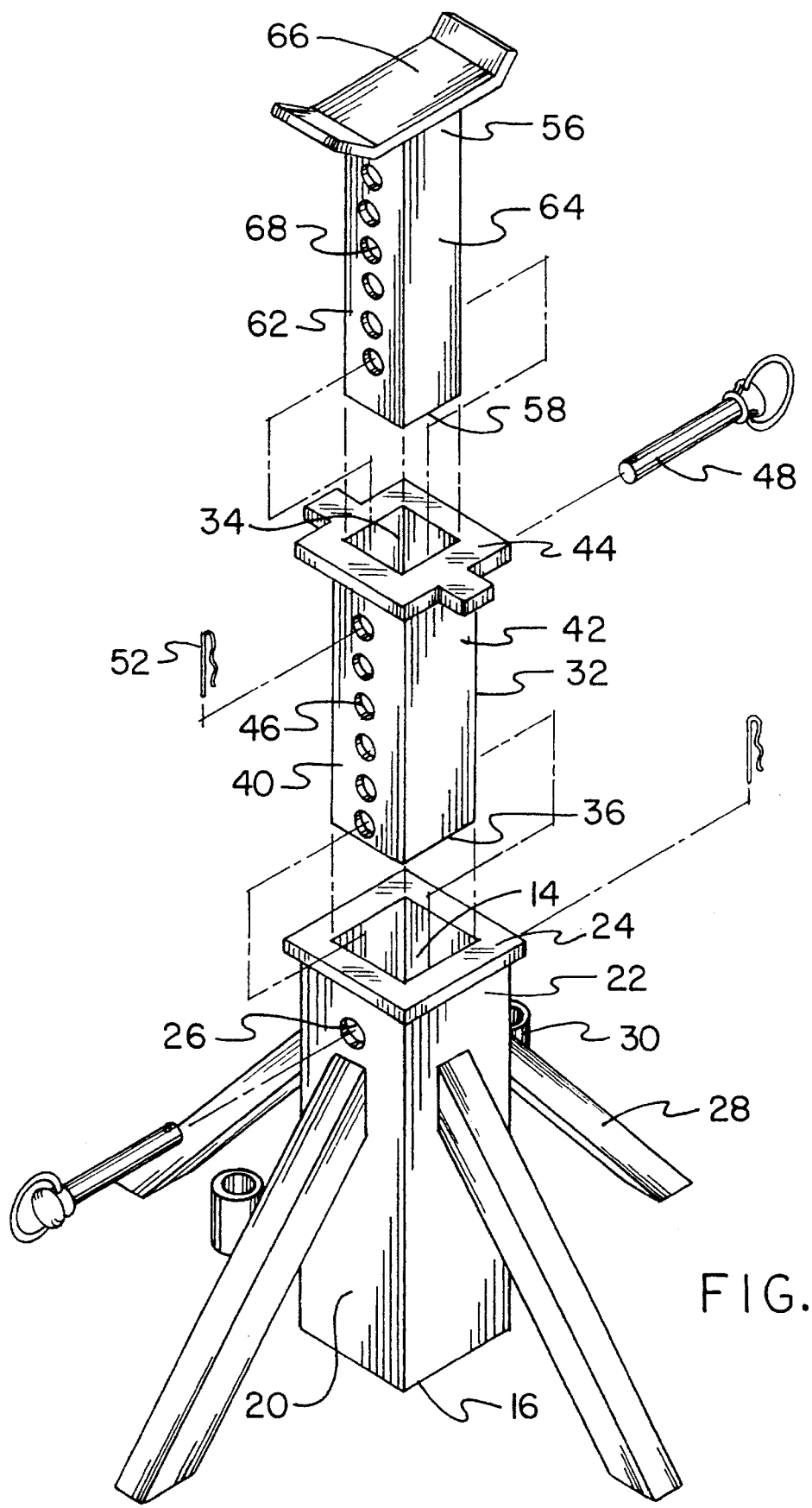
FIG. 7 is an exploded perspective view of the present invention.

With reference now to the drawings, and in particular, to FIG. 1 thereof, the preferred embodiment of the new and improved adjustable jack stand embodying the principles and concepts of the present invention and generally designated by the reference number 10 will be described.

Specifically, it will be noted in the various Figures that the device relates to a new and improved adjustable jack stand for supporting a vehicle or section of a vehicle above the ground at adjustable heights. In its broadest context, the device consists of a base support, a middle section, and an upper section.

The device 10 contains a base support 12 having an open first end 14, a closed second end 16, a front wall 18, a back wall 20, and two side walls 22. A support lip 24 is secured to the open first end 14. An aperture 26 is formed through the front wall 18 and extends through the back wall 20 downward of the open first end 14. A support leg 28 is secured extending downwardly from the front wall 18, the back wall 20, and from the two side walls 22. A pin holder 30 is secured to the support leg 28 that is secured to the front wall 18 and the support leg 28 that is secured to the back wall 20. The pin holder 30 serves to hold the fastening means of the device 10 when not in use.

The device 10 contains a middle section 32 having an open first end 34, a second end 36, a front wall 38, a back wall 40, and two side walls 42. An outwardly extending lip 44 is secured to the open first end 34. A plurality of apertures 46 are formed through the front wall 38 and extend through the back wall 40. The plurality of apertures 46 are preferably 1¼" apart. The middle section 32 is slidably coupled within the open first end 14 of the base support 12. The plurality of apertures 46 optionally align with the aperture 26 formed through the front wall 18 and through the back wall 20 of the base support 12 for securement therewith by a fastening means. The preferred fastening means used by the device 10 is a case hardened pin 48. The pin 48 has a circular groove 50 around an end portion thereof. A locking clip 52 secures within the circular groove 50 to lock the pin 48 within the apertures 26,46. The outwardly extending lip 44 serves to prevent the middle section 32 from sliding to a bottom of the base support 12. The outwardly extending lip 44 is prevented from being fully engulfed within the base support 12 by the support lip 24.

The device 10 contains an upper section 54 having a first end 56, a second end 58, a front wall 60, a back wall 62, and two side walls 64. A cradle support 66 is secured to the first end 56. The cradle support 66 serves to support the vehicle. A plurality of apertures 68 are formed through the front wall 60 and extend through the back wall 62. The plurality of apertures 68 are preferably 1¼" apart. The plurality of apertures 68 optionally align with the plurality of apertures 46 formed through the front wall 38 and through the back wall 40 of the middle section 32 for securement therewith by a fastening means. The preferred fastening means used by the device 10 is a case hardened pin 48. The pin 48 has a circular groove 50 around an end portion thereof. A locking clip 52 secures within the circular groove 50 to lock the pin 48 within the apertures 46,68. The cradle support 66 prevents the upper section 54 from fully entering the middle section 32.

The present invention is a jack stand which can be lowered to a height of 9¾" and elevated to as high as 17" above the ground at the top when extended.

The jack is made of steel, resting on a base with four legs that extend out and down at an angle. The center column is in three sections, one that is fixed at the base, and two which telescope together and into the base. All of the essential components are made of square tubing, with 3" size material in the base, 2½" in the second stage, and 2" in the third. A vertical array of holes in the columns is for steel pins that are inserted through the proper hole in order to establish the desired height of the jack stand. A wide cradle inserts into the top to support the loads that are placed on the unit.

Jack stands are commonly used to support sections or even an entire vehicle above the ground while work is performed. One, two, three or four may be used for the purpose. Most jack stands are made in only two sections, so they are limited in height when fully extended. This three section stand can be placed under a low vehicle and extended as necessary to a height that is well above that of two section units.

Load testing on this jack revealed that 35,550 pounds was required to cause the material to yield, 50,560 pounds to fail. For anyone requiring a durable jack stand, this is an ideal product.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved adjustable jack stand for supporting a vehicle or section of a vehicle above the ground at adjustable heights comprising, in combination:

a base support having an open first end, a closed second end, a front wall, a back wall, and two side walls, a support lip secured to the open first end, an aperture formed through the front wall and the back wall downward of the open first end, a support leg secured extending downwardly from the front wall, a support leg secured extending downwardly from the back wall, and a support leg extending downwardly from each of the two side walls, a pin holder secured to the support leg secured to the front wall and the support leg secured to the back wall, each pin holder comprising a a cylindrical container having open upper end and a closed lower end whereby the open upper end dimensioned to receive a locking pin therein;

a middle section having an open first end, a second end, a front wall, a back wall, and two side walls, an outwardly extending lip secured to the open first end, a plurality of apertures formed through the front wall and the back wall, the middle section slidably coupled within the open first end of the base support, the plurality of apertures optionally aligning with the aperture formed through the front wall and back wall of the base support for securement therewith by a fastening means, the outwardly extending lip serving to prevent the middle section from sliding to a bottom of the base support;

an upper section having a first end, a second end, a front wall, a back wall, and two side walls, a cradle support secured to the first end, the cradle support serving to support the vehicle, a plurality of apertures formed through the front wall and the back wall, the plurality of apertures optionally aligning with the plurality of apertures formed through the front wall and the back wall of the middle section for securement therewith by a fastening means.

* * * * *